United States Patent
Czerkas

(10) Patent No.: US 8,149,383 B2
(45) Date of Patent: Apr. 3, 2012

(54) METHOD FOR DETERMINING THE SYSTEMATIC ERROR IN THE MEASUREMENT OF POSITIONS OF EDGES OF STRUCTURES ON A SUBSTRATE RESULTING FROM THE SUBSTRATE TOPOLOGY

(75) Inventor: Slawomir Czerkas, Weilburg (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 911 days.

(21) Appl. No.: 12/219,000

(22) Filed: Jul. 21, 2008

(65) Prior Publication Data

US 2009/0033894 A1    Feb. 5, 2009

(30) Foreign Application Priority Data

Aug. 3, 2007  (DE) .......................... 10 2007 036 815

(51) Int. Cl.
*G03B 27/42* (2006.01)
(52) U.S. Cl. ............ 355/53; 355/52; 356/614; 356/138; 356/139.03; 356/510
(58) Field of Classification Search .................... 355/52, 355/53; 356/614, 138, 139.03, 510
See application file for complete search history.

(56) References Cited

U.S. PATENT DOCUMENTS

| | | | |
|---|---|---|---|
| 5,136,149 A | 8/1992 | Fujiwara et al. | 250/201.5 |
| 6,259,960 B1 | 7/2001 | Inokuchi | 700/110 |
| 6,347,458 B1 | 2/2002 | Kaczynski | 33/503 |
| 6,377,870 B1 | 4/2002 | Blaesing-Bamgert et al. | 700/245 |
| 6,504,608 B2 | 1/2003 | Hallmeyer et al. | 356/369 |
| 6,677,565 B1 | 1/2004 | Wahl et al. | 250/201.3 |
| 6,924,929 B2 | 8/2005 | Yasuda et al. | 359/383 |
| 6,960,755 B2 | 11/2005 | Kaczynski | 250/221 |
| 2005/0254068 A1 | 11/2005 | Rinn et al. | 356/625 |

FOREIGN PATENT DOCUMENTS

| | | |
|---|---|---|
| DE | 198 58 428 | 7/2000 |
| DE | 199 49 005 | 5/2001 |
| DE | 19963345 | 7/2001 |
| DE | 101 06 699 | 8/2002 |
| DE | 10 2004 023 739 | 12/2005 |

OTHER PUBLICATIONS

Gerhard Schlueter et al.:"Next generation mask metrology tool," Photomask and Next-Generation Lithography Mask Technology IX, Proceedings of SPIE vol. 4754, 758-768, 2002, 11 pages.
Carola Blaesing:"Pattern Placement Metrology for Mask Making," presented by Dr. Carola Bläsing at the Semicon meeting, Education Program in Geneva, Switzerland on Mar. 31, 1998, 11 pages.

*Primary Examiner* — Edward Glick
*Assistant Examiner* — Mesfin T Asfaw
(74) *Attorney, Agent, or Firm* — Davidson, Davidson & Kappel, LLC

(57) ABSTRACT

A method for determining the lateral correction as a function of the substrate topology and/or the geometry of the substrate holder is disclosed. The substrate is placed on a measuring stage traversable in the X coordinate direction and Y coordinate direction, which carries the substrate to be measured. The substrate is supported on at least three support points which define a plane. An apparatus is provided for determining the position of a plurality of positions on the surface of the substrate in the in the X, Y and Z coordinate directions. The substrate is tiltable about an axis parallel to the X/Y plane, to enable the substrate to be measured in a tilted position.

10 Claims, 4 Drawing Sheets

METHOD FOR DETERMINING THE SYSTEMATIC ERROR IN THE MEASUREMENT OF POSITIONS OF EDGES OF STRUCTURES ON A SUBSTRATE RESULTING FROM THE SUBSTRATE TOPOLOGY

This claims the benefit of German Application No. DE 10 2007 036 815.3 filed on Aug. 3, 2007 and hereby incorporated by reference herein.

FIELD OF THE INVENTION

The present invention relates to a method for determining the systematic error in the measurement of positions of edges of structures on a substrate resulting from the substrate topology and/or from the geometry of the substrate holder and the coordinate measuring machine. In particular the method relates to the determination of the systematic error in the measurement of structures on a substrate. The substrate can be held in any number of ways, preferably the substrate is placed in a measuring stage and positioned in a plane by means of three support points.

BACKGROUND

An apparatus of the generic type is also disclosed, for example, in DE 199 49 005, DE 198 58 428, DE 101 06 699 or DE 10 2004 023 739. All the here cited documents of the state of the art disclose a coordinate measuring machine for measuring structures on a substrate. Herein the substrate is placed on a stage moveable in the X coordinate direction and Y coordinate direction. The coordinate measuring machine is formed such that the positions of structures or edges of structures can be determined by a measuring lens. Herein the position of the measuring stage is determined by an interferometer. It is, however, possible to determine the position of the stage in other ways, wherein ultimately the position of the edge in relation to a coordinate system of a measuring machine is determined.

A coordinate measuring machine as used for measuring structures on wafers and masks used for their manufacture has been disclosed in the paper entitled "Pattern Placement Metrology for Mask Making" by Dr. Carola Blasing. The paper was held at the Semicon Education Program Convention in Geneva on Mar. 31, 1998. The description given there is the basis for a coordinate measuring machine, of which various models are already commercially available.

U.S. Pat. No. 5,136,149 discloses a focusing method for an optical head. In the focusing process the object is obliquely illuminated. The light returned from the object is directed onto a Position Sensitive Device (PSD). The focus position and the tilt of the object in space can be determined from the PSD signal. The apparatus proposed here is not a coordinate measuring machine.

U.S. Pat. No. 6,677,565 discloses a method for high-speed autofocus. Herein a light pattern is projected onto the surface of an object to be measured. Analysis of the image of the light pattern returned by the object is used to determine the focus position and the tilt of the object. This document does not deal with the problems arising from the measurement of positions of structures on a substrate (mask).

U.S. Pat. No. 6,924,929 discloses a microscope, comprising a stage translatable in a horizontal direction. A line sensor is used to record an image of the sample during movement of the stage. The microscope proposed here does not make reference to the measurement of positions of structures on a substrate.

German Patent Application Publication DE 199 63 345 A1 discloses an optical measuring arrangement and a method for inclination measurement. This document likewise does not deal with the measurement of positions of structures on a substrate.

U.S. Pat. No. 6,259,960 discloses a system for the inspection of defects on a substrate (wafer). An image of a defect is generated by an electron microscope. Information about the size and position of a defect on a wafer, for example, can be called up from a database. An optical measurement of positions of edges of structures is not dealt with in this document. Further an inspection of defects is disclosed, which differs distinctly from a method for measuring positions of structures on a substrate (mask).

SUMMARY OF THE INVENTION

An object of the present invention is to provide a method for achieving greater inspection accuracy and wherein the measured data can be corrected by means of correction values.

The present invention provides a method including the following steps:
  measuring a position in X, Y and Z coordinate directions at each of a plurality of positions on a surface of the substrate;
  tilting the substrate about an axis parallel to the X/Y plane of the coordinate measuring machine, to set a tilted position;
  measuring the position of at least one edge in the X, Y and Z coordinate directions at a plurality of positions of structures on the surface of the substrate at positions on the substrate which coincide with the positions on the substrate prior to tilting;
  determining a deviation of the lateral position of the at least one edge from the two measurements made at the same position on the substrate; and
  obtaining a correction value on the basis of the deviation determined from the two measurements made at the same position on the substrate, to minimize the deviation of the lateral position of the at least one edge.

The invention enables the utilization of a coordinate measuring machine to determine the lateral correction as a function of the substrate topology. Herein the substrate is placed on a stage moveable in the X coordinate direction and Y coordinate direction. The measuring stage carries the substrate to be measured. The substrate is placed on three support points which define a plane. Further an apparatus is provided for determining the position of a plurality of positions on the surface of the substrate in the Z coordinate direction. Herein the substrate is tiltable about an axis parallel to the X/Y plane, to enable measurement of the substrate in a tilted position.

Three support points may be provided on the substrate holder, wherein at least one support point can include a spacer element, so that the plane defined by the three support points and the one spacer element is inclined (tilted) with respect to the horizontal plane, thus enabling the rotation about the axis parallel to the X/Y plane to be adjusted. Rotation of the substrate can be carried out in any number of ways, such as by using a different substrate holder, with, for example, three support points of different heights which tilt the substrate to the required angle. Another possibility would be to provide one of the support points with a spacer element to thus adjust the tilt of the substrate.

Once the plane defined by the support points, or the support point and the at least one spacer element is determined, the surface of the substrate positioned on the support points can be determined therefrom. The local thickness of the substrate can be calculated from the local distance of the plane to the surface of the substrate.

The apparatus for determining the position of a plurality of positions on the surface of a substrate in the Z coordinate direction can be a measuring lens, a lens with great depth of focus, a mechanical detector or any other suitable (maybe not yet known) measuring probe or measuring sensor.

The method for determining the systematic error resulting from the substrate topology and coordinate measuring machine is particularly advantageous, if the substrate is placed in a measuring stage, wherein the substrate is supported on three support points which define a plane. First one position is measured at each of a plurality of positions on the surface of the substrate in the Z coordinate direction. The substrate is then tilted about an axis parallel to the X/Y plane of the coordinate measuring machine, to adjust the substrate into a tilted position. Subsequently in the Z coordinate direction, the position of at least one edge is measured at a plurality of positions on the surface of the substrate which coincide with the positions on the substrate prior to tilting. A deviation of the lateral position of the at least one edge of each measured structure is obtained from the two measurements carried out at the same position on the substrate. On the basis of the deviation resulting from the two measurements made of the same position on the substrate, a correction value is then determined which minimizes the deviation of the lateral position of the at least one edge. A geometric displacement of the structures (cosine error) resulting from the tilt, must be taken into consideration, if necessary, in the determination of the correction values. The cosine error can be determined by specifically pivoting the substrate about a defined axis.

The substrate topology to be measured depends on the wedge shape of the substrate and/or the unevenness of the substrate and/or the geometry of the substrate support and/or from the systematic error resulting from the coordinate measuring machine.

BRIEF DESCRIPTION OF THE DRAWINGS

Exemplary embodiments of the invention and their advantages will be described in the following with respect to the accompanying drawings in more detail, in which.

DETAILED DESCRIPTION

Figure 1:
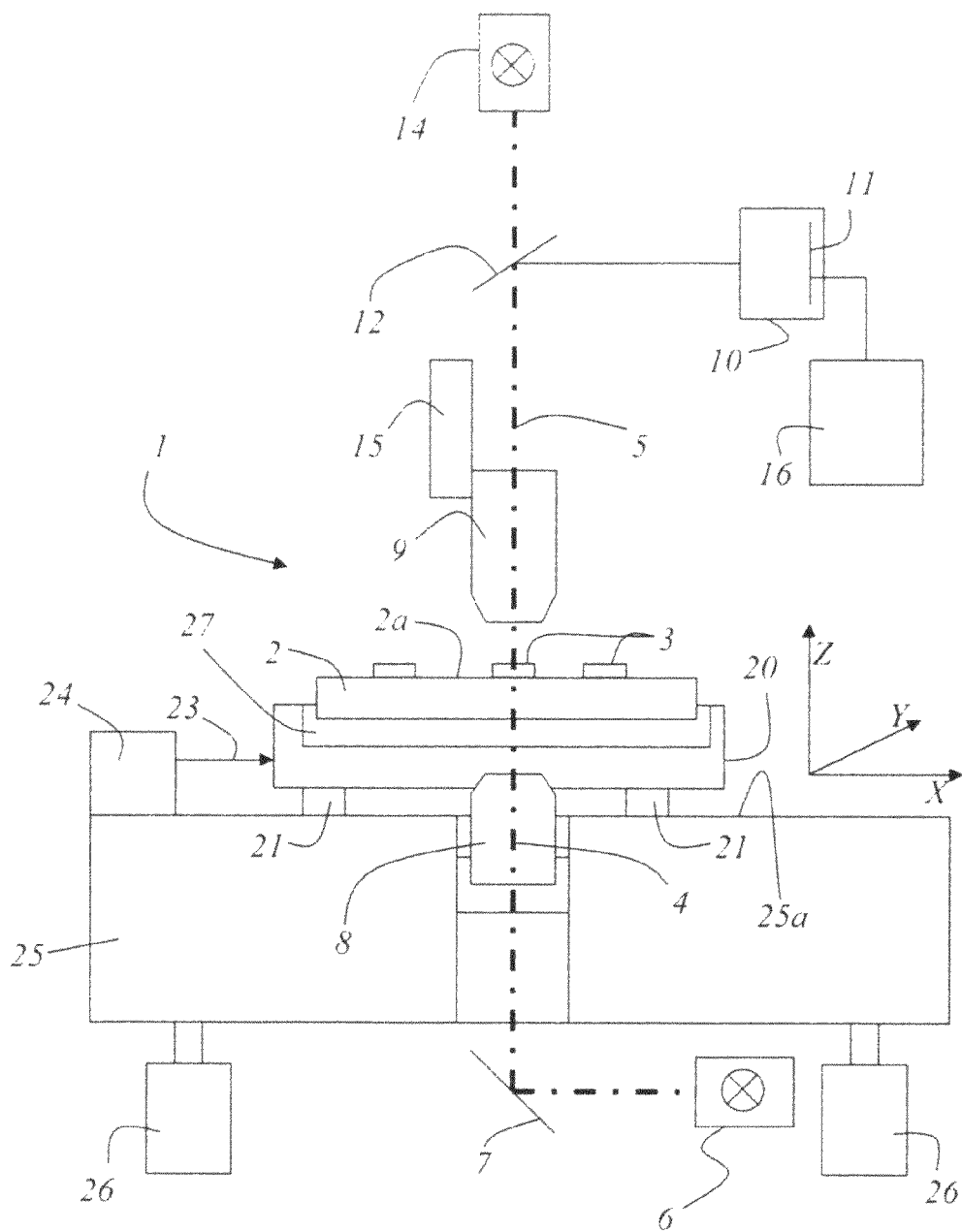
FIG. 1 schematically shows a coordinate measuring machine according to the prior art.

FIG. 1 shows a coordinate measuring machine 1, as it has been used for a considerable time in the prior art. The coordinate measuring machine is used in particular to determine the positions of structures 3 on a substrate 2. In the embodiment shown here substrate 2 is placed in a substrate holder 27. It is also conceivable that substrate 2 be placed directly on a measuring stage 20. In the embodiment shown here substrate holder 27 is placed on measuring stage 20. The measuring stage 20 supported on air bearings 21 is traversable in a plane 25a in the X coordinate direction and Y coordinate direction. Plane 25a is defined by a structural element 25 in this case. In one embodiment the structural element can be a granite block. The position of measuring stage 20 is interferometrically determined. At least one interferometer 24 is provided for position determination which directs a light beam 23 onto measuring stage 20. For the illumination of substrate 2 an incident-light illumination means 14 can be provided, which directs the illumination light via a measuring lens 9 along an incident-light illumination beam path 5 to substrate 2. It is also possible to illuminate substrate 2 with transmitted light. In this case a transmitted-light illumination means 6 is provided, which couples light into the transmitted-light illumination beam path 4 via a redirecting mirror 7. The light is directed onto substrate 2 via a condenser 8.

A granite block 25 is supported on vibration-damped legs 26. The light emitted by substrate 2 is directed via a beam-splitting mirror 12 to a camera 10, including a detector 11. Detector 11 is connected to a computer 16, for producing a digital image from the data recorded by detector 11. Measuring lens 9 can be positioned in the Z coordinate direction using displacement means 15, and in this way can be focused on surface 2a of substrate 2 via displacement means 15.

Figure 2:
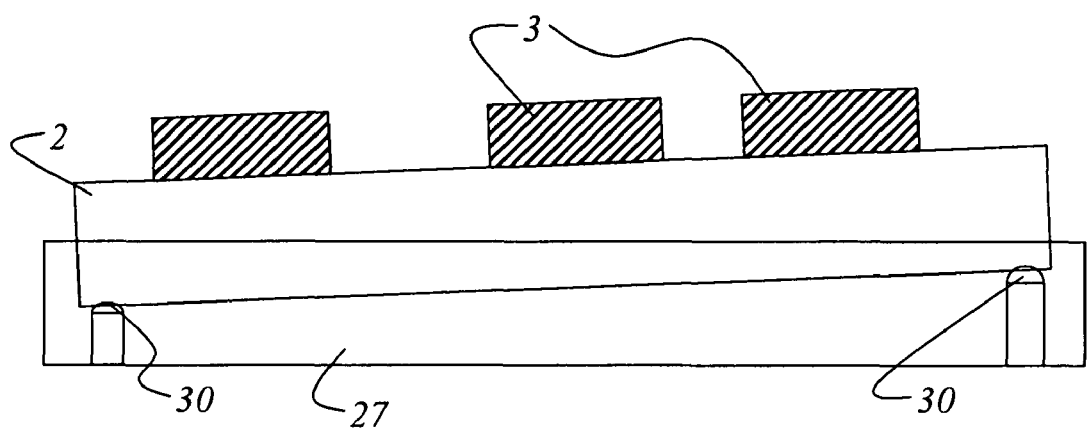
FIG. 2 shows a schematic representation of the setting of a defined pivoting (tilting) of a substrate using a substrate holder formed for this purpose.

FIG. 2 shows a schematic representation of the setting of a defined tilt of substrate 2 using a substrate holder 3 formed especially for this purpose. In this exemplary embodiment the defined inclination of substrate 2 is set using a substrate holder 27 formed in a corresponding way. For this purpose, support points 30 each have a different height. As a result of the tilting the structures undergo a geometric displacement (cosine error). This has to be taken into consideration, if necessary, when determining the correction value. As already mentioned, the cosine error can be determined by specifically tilting the substrate about a defined axis.

Figure 3A:
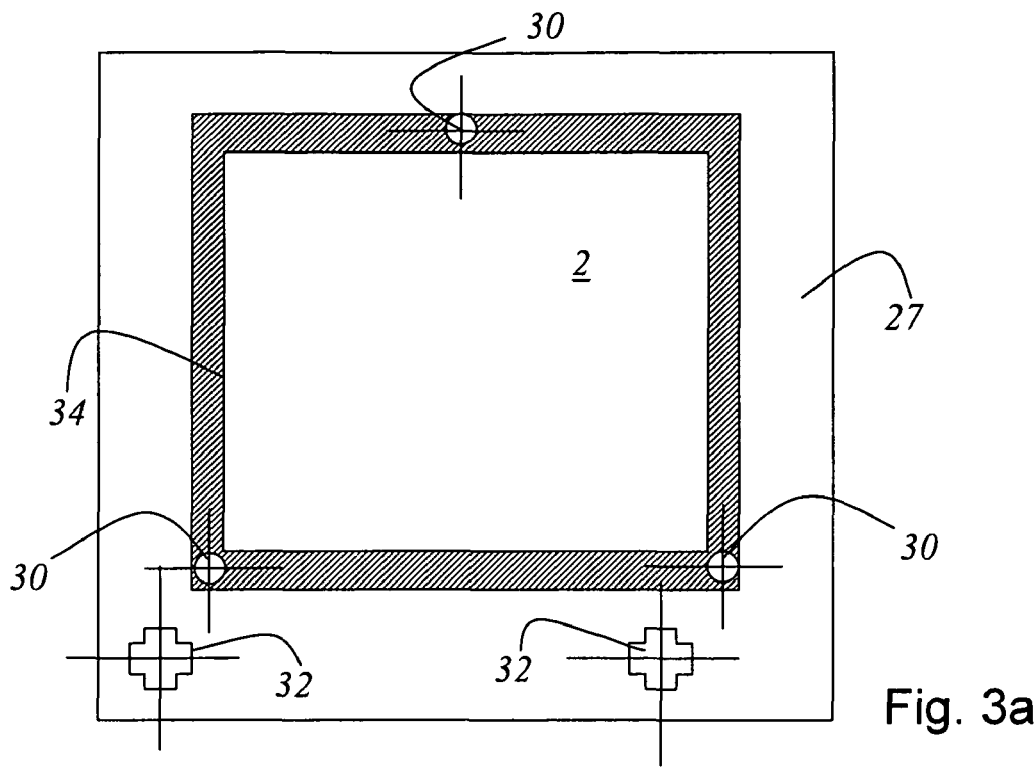
FIG. 3a schematically shows a substrate holder with a substrate inserted for measurement by the coordinate measuring machine.

FIG. 3a shows a schematic representation of a substrate 2 placed in a substrate holder 27. In the embodiment shown here, the substrate 2 is supported on three support points 30. The three support points 30 define a plane in which the substrate is ultimately positioned. The support points 30 distributed around a periphery 34 of substrate holder 27 in a predefined pattern, only touch substrate 2 at specific points. The degree of bending of substrate 2 can be calculated from knowledge of the distribution pattern of support points 30 on periphery 34 of substrate holder 27. Additional reference marks 32 can be provided on substrate holder 27 to determine the position of substrate holder 27 relative to a coordinate system of coordinate measuring machine 1.

Figure 3B:
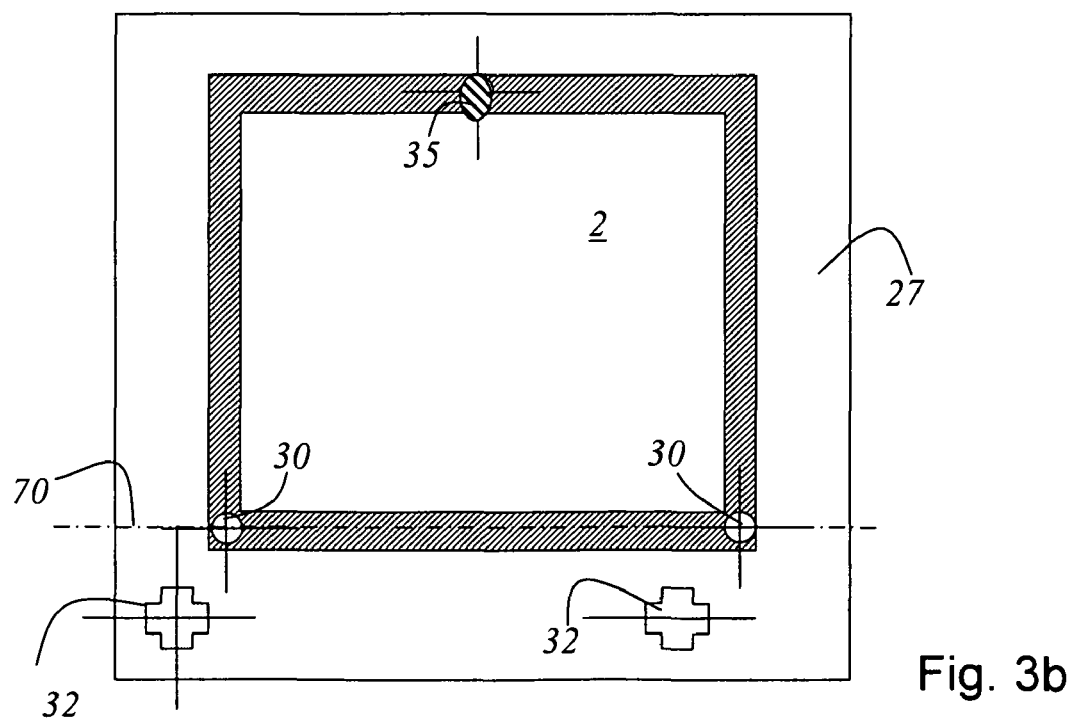
FIG. 3b also schematically shows the substrate holder with a substrate inserted, wherein a support point with an additional spacer element is provided, so that the substrate is tilted about an axis with respect to the X/Y plane.

FIG. 3b shows substrate 2 tilted about an axis 70. Axis 70 is parallel to the X/Y plane of the coordinate system of coordinate measuring machine 1. Tilting about axis 70 can be carried out by placing a spacer element 35 on support point 30, thus causing substrate 2 to be inclined at an angle to the X/Y plane. Measurement involves determining the position of a plurality of structures in the Z coordinate direction. In this case each position is measured once prior to tilting of substrate 2 and once following the tilting of substrate 2. The lateral displacement of the various structures 3 on substrate 2 can subsequently be determined from the two measurements. This measurement can also be used to determine the thickness deviation of substrate 2.

Figure 4A:
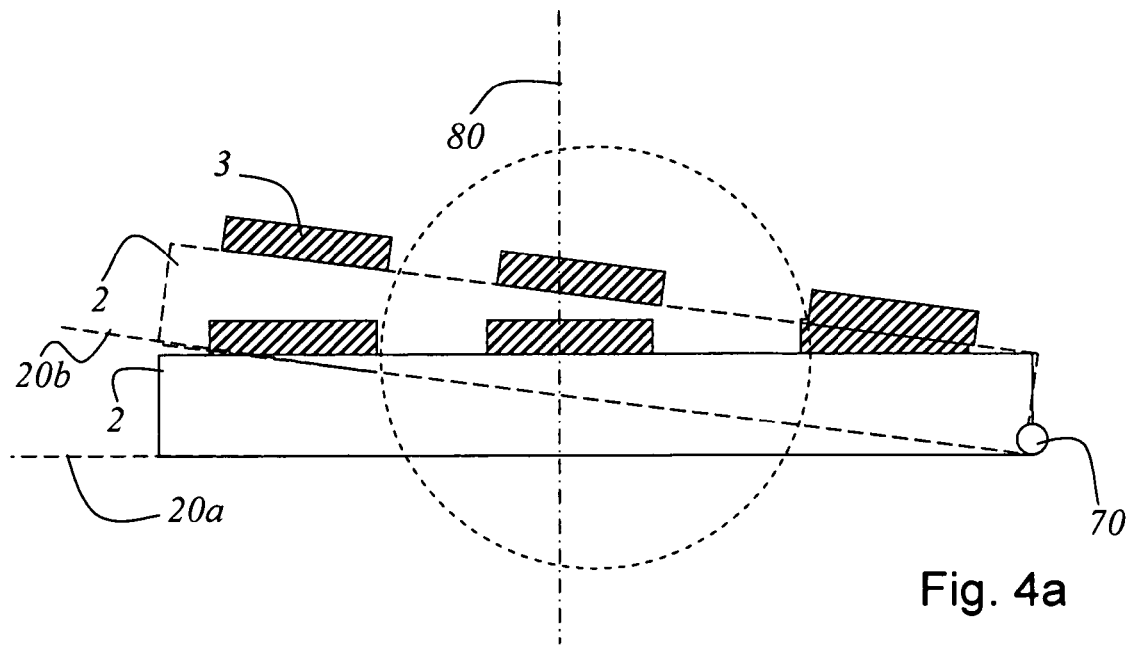
FIG. 4a shows a side view, wherein the substrate is shown once in a position prior to tilting and once in a tilted position.

FIG. 4a shows a schematic side view of substrate 2. The position depicted by solid lines shows substrate 2 prior to tilting. In the second position depicted by broken lines, substrate 2 is tilted about axis 70. FIG. 4a shows clearly that structure 3 on substrate 2 at measuring position 80 is displaced with respect to measuring position 80.

Figure 4B:
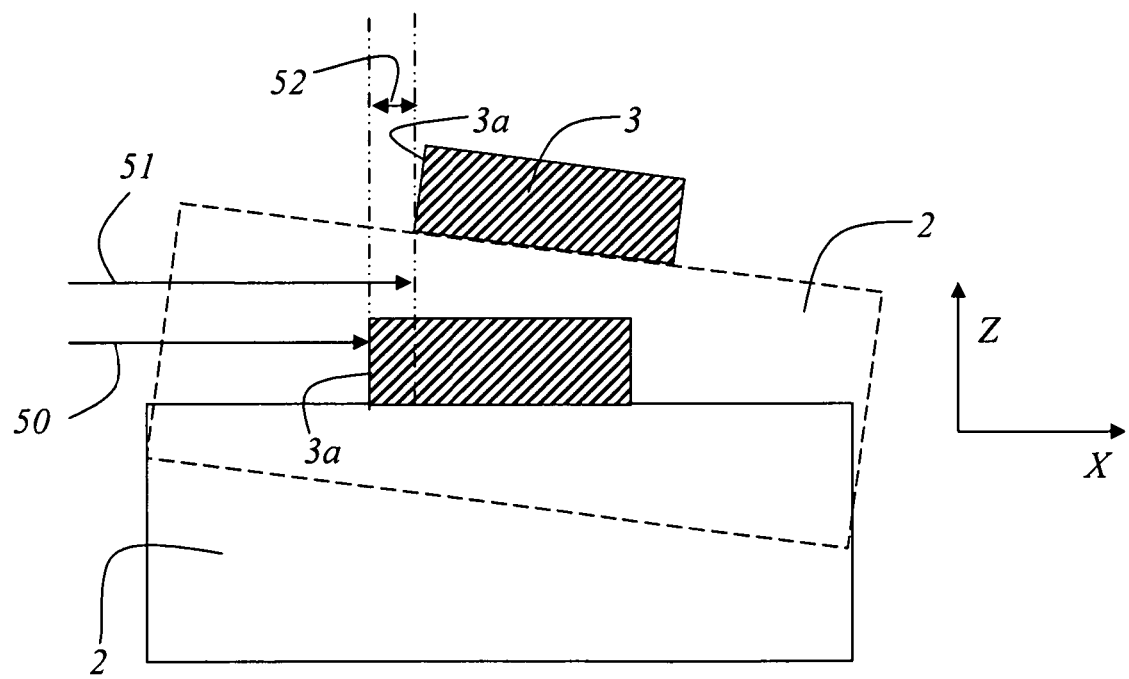
FIG. 4b shows a detail view of FIG. 4a, wherein the lateral displacement is depicted that can be determined as a result of tilting of the substrate.

FIG. 4b schematically shows the enlarged representation of an area in FIG. 4a, marked by a broken circle. FIG. 4b is an enlarged representation of substrate 2 in a position prior to tilting, and in a tilted position. As explained in FIG. 4a, the rotated position is depicted by broken lines. As already described with reference to FIGS. 1 and 2, a laser interferometer is used to sample or determine the position of an edge 3a of a structure 3. As shown in FIG. 4b, the position of edge 3a on substrate 2 prior to tilting is indicated by arrow 50. The position of edges 3a following tilting of substrate 2 is indicated by arrow 51. A difference from the two measurements between the position of edge 3a on substrate 2 prior to tilting and the position of edge 3a on the tilted substrate 2 can therefore be determined. This difference is illustrated in FIG. 4b by double-headed arrow 52. This deviation (cosine error) must be taken into consideration, if necessary, when determining a correction value. The correction can take the form of either a single correction value and/or a correction function.

The invention has been described with reference to a particular embodiment. It is conceivable, however, that variations and modifications of the invention can be made without departing from the scope of protection of the appended claims.

What is claimed is:

1. A method for determining the systematic error in the measurement of positions of edges of structures on a substrate resulting from the substrate topology and a coordinate measuring machine, wherein the substrate on a measuring stage is positioned in a plane on three support points, comprising the following steps:
   measuring a position in X, Y and Z coordinate directions at each of a plurality of positions on a surface of the substrate;
   tilting the substrate about an axis parallel to the X/Y plane of the coordinate measuring machine, to set a tilted position;
   measuring an edge position of at least one edge in the X, Y and Z coordinate directions at a plurality of positions of structures on the surface of the substrate at positions on the substrate which coincide with the positions on the substrate prior to tilting;
   determining a deviation of the lateral position of the at least one edge from the two measurements made at the same position on the substrate; and
   obtaining a correction value on the basis of the deviation determined from the two measurements made at the same position on the substrate, to minimize a deviation of the lateral position of the at least one edge.

2. The method according to claim 1, wherein a spacer element is placed on one of said support points so that the substrate is inclined about the axis parallel to the X/Y plane of the coordinate measuring machine.

3. The method according to claim 1, wherein the axis parallel to the X/Y plane of the coordinate measuring machine is oriented along the X coordinate direction or the Y coordinate direction.

4. The method according to claim 1, wherein the substrate topology to be measured depends on a wedge shape of the substrate and/or an unevenness of the substrate and/or a geometry of the substrate holder and/or a systematic error resulting from the coordinate measuring machine.

5. The method according to claim 1, wherein the correction comprises either a correction function or correction values.

6. The method according to claim 1, wherein the plane corresponds to the X/Y plane defined by the measuring stage.

7. The method according to claim 1, wherein the geometric displacement of the structures as a result of tilting is taken into consideration in obtaining the correction.

8. The method according to claim 1, wherein the position of the substrate is determined relative to the position of a coordinate system of the support points.

9. The method according to claim 1, wherein an apparatus is provided for determining the position of edges of a plurality of structures on the surface of the substrate in the Z coordinate direction, comprising a measuring lens, a lens with great depth of focus, a mechanical detector.

10. The method according to claim 9, wherein the position in the Z coordinate direction is determined by focus adjustment using a measuring lens.

* * * * *